(12) United States Patent
Gmirya et al.

(10) Patent No.: US 9,212,679 B2
(45) Date of Patent: Dec. 15, 2015

(54) HIGH SHEAR CAPABILITY INTERFACE

(71) Applicant: Sikorsky Aircraft Corporation, Stratford, CT (US)

(72) Inventors: Yuriy Gmirya, Woodbridge, CT (US); Matthew J. Karlak, Plymouth, CT (US); John H. Meeson, Jr., Trumbull, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 95 days.

(21) Appl. No.: 14/087,464

(22) Filed: Nov. 22, 2013

(65) Prior Publication Data

US 2015/0147132 A1    May 28, 2015

(51) Int. Cl.
  *F16B 35/02*   (2006.01)
  *F16B 21/10*   (2006.01)
  *F16B 19/00*   (2006.01)

(52) U.S. Cl.
  CPC ............... *F16B 21/10* (2013.01); *F16B 19/00* (2013.01)

(58) Field of Classification Search
  CPC ...... F16B 5/0208; F16B 5/0283; F16B 35/00; F16B 19/00; F16B 21/10; F16B 35/02
  USPC .......................................................... 411/383
  See application file for complete search history.

(56) References Cited

U.S. PATENT DOCUMENTS

| | | | |
|---|---|---|---|
| 1,467,824 A * | 9/1923 | Ahlers ........................... 411/270 |
| 3,271,058 A * | 9/1966 | Anderson ................... 403/408.1 |
| 3,430,460 A | 3/1969 | Hankinson |
| 4,186,570 A | 2/1980 | Pokrandt |
| 4,326,825 A | 4/1982 | Volkmann et al. |
| 4,863,329 A * | 9/1989 | Wilson .......................... 411/339 |
| 4,889,458 A * | 12/1989 | Taylor ........................... 411/383 |
| 5,018,920 A * | 5/1991 | Speakman ...................... 411/43 |
| 5,110,244 A | 5/1992 | Garman |
| 5,238,342 A * | 8/1993 | Stencel ............................ 411/43 |
| 5,551,790 A | 9/1996 | Melton |
| 5,577,854 A * | 11/1996 | Jacob et al. ....................... 403/2 |
| 5,603,592 A * | 2/1997 | Sadri et al. ...................... 411/34 |
| 5,947,667 A | 9/1999 | Cassatt et al. |
| 6,402,089 B1 * | 6/2002 | Kiss et al. .................. 244/17.27 |
| 7,438,262 B2 | 10/2008 | Chamberlain |
| 7,891,924 B2 | 2/2011 | Mercer et al. |
| 8,382,413 B2 * | 2/2013 | Nguyen et al. ............... 411/383 |
| 8,702,362 B2 * | 4/2014 | Zhu .............................. 411/166 |
| 2012/0006934 A1 * | 1/2012 | Prud'Homme-Lacroix et al. .......................... 244/17.27 |

\* cited by examiner

*Primary Examiner* — Roberta Delisle
(74) *Attorney, Agent, or Firm* — Cantor Colburn LLP

(57) ABSTRACT

A connection between a first component and a second component is provided including a first hole formed in a portion of the first component and a second hole formed in a portion of the second component. The second hole is aligned with the first hole. A pin includes a through hole having a pin hole diameter. The pin extends through a portion of the first hole and into a first portion of the second hole. The pin is configured to absorb a shear load applied to the connection. A bolt extends through the second hole and the pin such that a clearance fit is formed between the bolt and the pin. The bolt is configured to absorb an axial load applied to the connection. A nut connected to the free end of the bolt limits movement of the bolt relative to the first and second component.

19 Claims, 4 Drawing Sheets

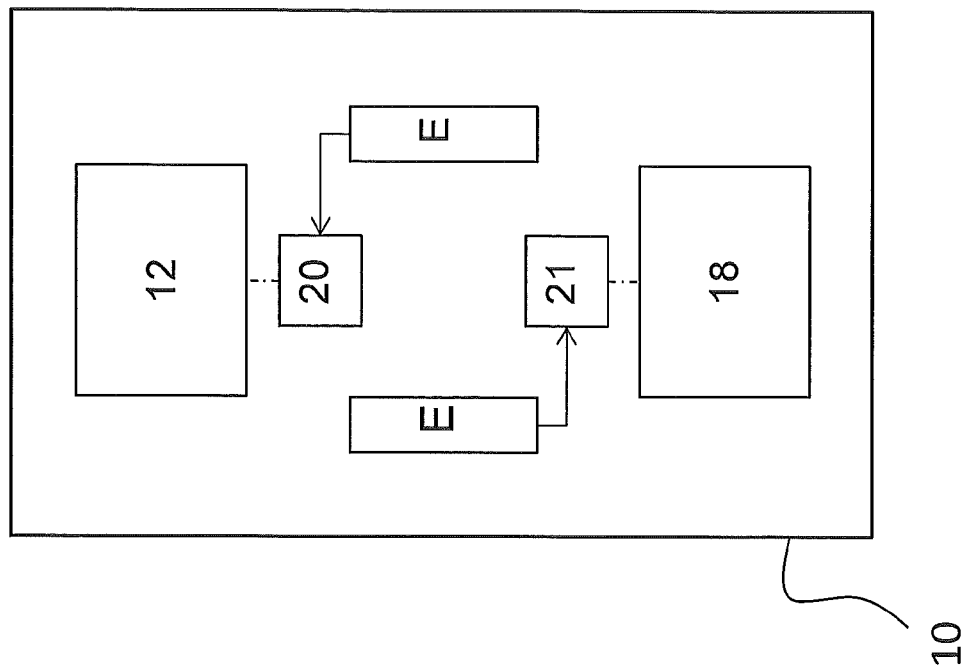
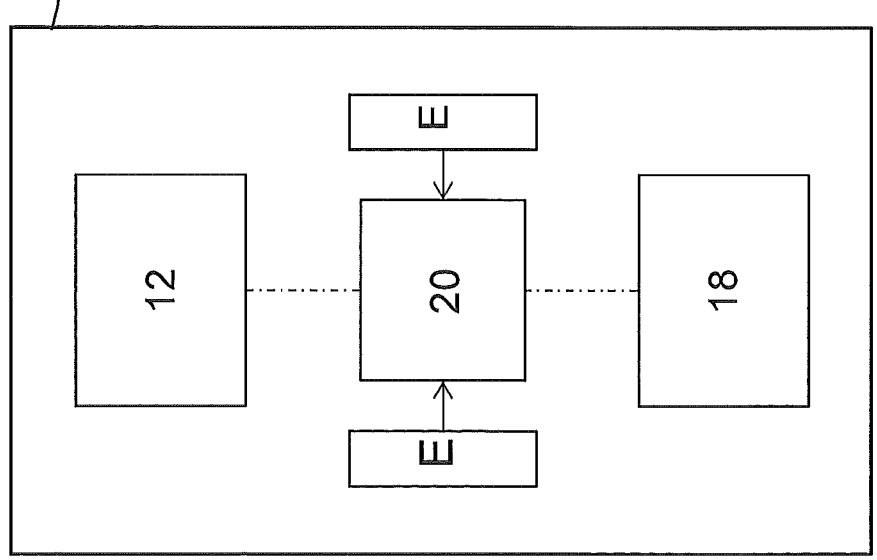

US 9,212,679 B2

HIGH SHEAR CAPABILITY INTERFACE

This invention was made with Government support under Agreement N00019-06-C-0081. The Government has certain rights in the invention.

BACKGROUND OF THE INVENTION

Conventional rotary wing aircrafts commonly use large bolts to form highly loaded connections between adjacent components, such as a gearbox housing and the structural airframe. These highly loaded connections typically require close tolerances to effectively distribute the loads between the component and the airframe. Some components of newer rotary wing aircrafts are formed from stronger materials to improve the fatigue life and load carrying capabilities of the components. When one of these new components is used in a highly loaded connection, the new component may have a different coefficient of thermal expansion than the part the new component is being coupled to.

The close tolerances and different coefficients of thermal expansion in combination can create problems during assembly and installation of the highly loaded connection in a location outside of standard room and machining temperature ranges. If a temperature differential exists between the components or if the assembly takes place in an environment warmer or cooler than room temperature, assembly of the components to form a highly loaded connection may be impossible.

BRIEF DESCRIPTION OF THE INVENTION

According to one embodiment of the invention, a connection between a first component and a second component is provided including a first hole formed in a portion of the first component and a second hole formed in a portion of the second component. The second hole is aligned with the first hole. A pin includes a through hole having a pin hole diameter. The pin extends through the a portion of the first hole and into a first portion of the second hole. The pin is configured to absorb a shear load applied to the connection. A bolt extends through the second hole and the pin such that a clearance fit is formed between the bolt and the pin. The bolt is configured to absorb an axial load applied to the connection. A nut connected to the free end of the bolt limits movement of the bolt relative to the first and second component.

According to another embodiment of the invention, a method of forming a connection between a first component and a second component is provided. The first coefficient of thermal expansion is different from the second coefficient of thermal expansion. A pin is inserted through a first hole formed in the first component and into a portion of a second hole formed in the second component. The pin is configured to absorb a shear load applied to the connection. A clearance fit is formed between the bolt and the pin. A bolt is inserted into the second hole and through a through hole of the pin. The bolt is configured to absorb an axial load applied to the connection. A nut is coupled to a free end of the bolt to retain the bolt in position relative to the first component and the second component.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIGS. 2a and 2b are schematic diagrams of a main rotor system of a rotary wing aircraft;

The detailed description explains embodiments of the invention, together with advantages and features, by way of example with reference to the drawings.

DETAILED DESCRIPTION OF THE INVENTION

Figure 1:
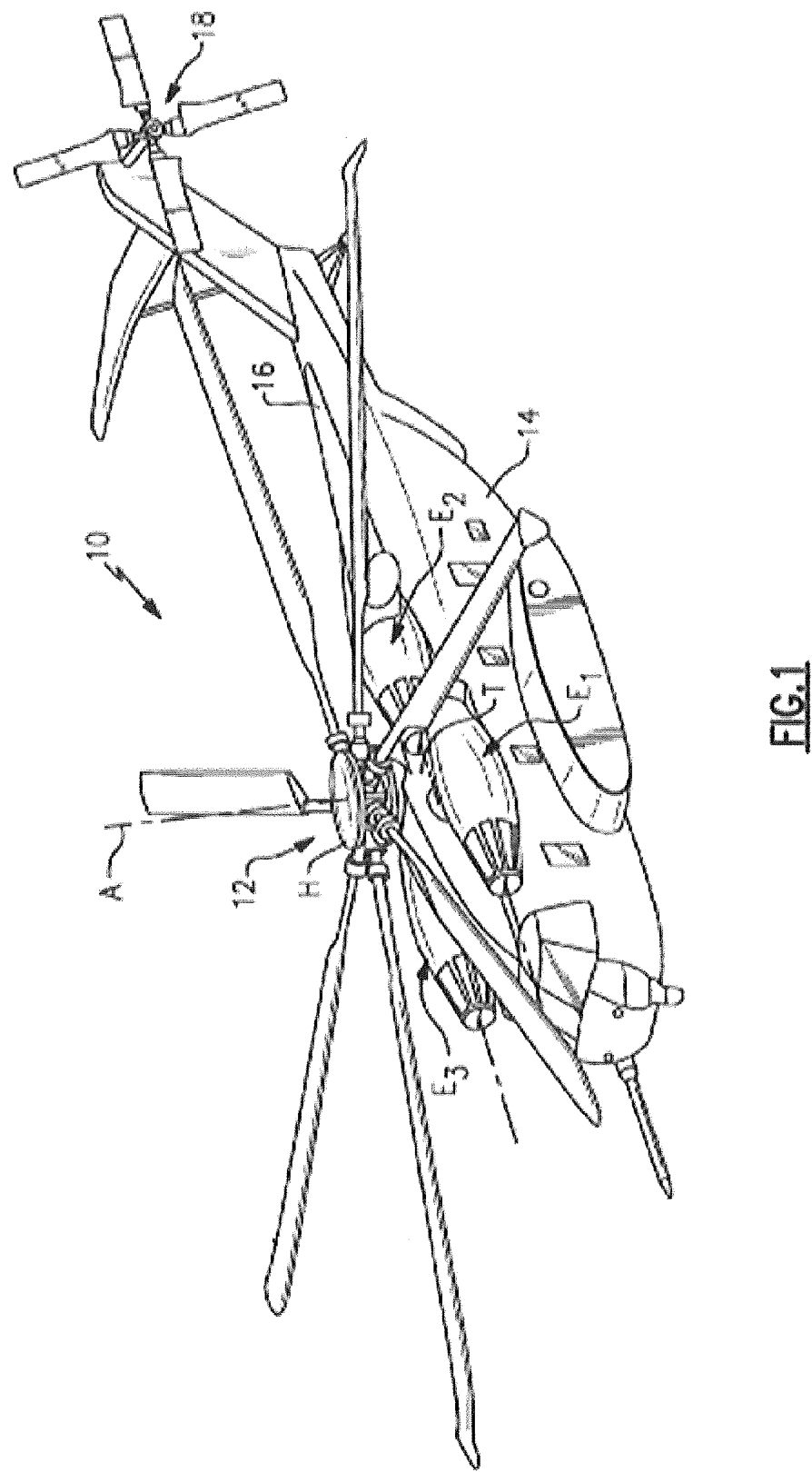
FIG. 1 is a perspective view of an example of a rotary wing aircraft.

FIG. 1 schematically illustrates a rotary-wing aircraft 10 having a main rotor system 12. The aircraft 10 includes an airframe 14 having an extending tail 16 which mounts a tail rotor system 18, such as an anti-torque system, a translational thrust system, a pusher propeller, or a rotor propulsion system for example. Power is transferred from one or more engines E to a power transmission gearbox 20 (see FIGS. 2a and 2b), to drive the main rotor system 12 about a respective axis of rotation A. Although a particular rotary wing aircraft configuration is illustrated and described in the disclosed embodiment, other configurations and/or machines, such as a high speed compound rotary wing aircraft with supplemental translational thrust systems, a dual contra-rotating, coaxial rotor system aircraft, and a turbo-prop, tilt-rotor or tilt-wing aircraft for example, will also benefit from the present invention.

Referring now to FIG. 2a, a schematic diagram of the main rotor system 12 and the tail rotor system 18 of the aircraft 10 of FIG. 1 is provided in more detail. In the illustrated non-limiting embodiment, the power transmission gearbox 20 is interposed between one or more engines E1, E2, E3, the main rotor system 12 and the tail rotor system 18. The gearbox 20 may be mechanically connected to and configured to operate both the main rotor system 12 and to the tail rotor system 18. In another embodiment, shown in FIG. 2b, the rotary wing aircraft 10 includes a first power transmission gearbox 20 mechanically coupled to and configured to operate the main rotor system 12. Similarly, the second power transmission gearbox 21 is mechanically connected to and configured to operate the tail rotor system 18. Each of the power transmission gearboxes 20, 21 receives power from at least one engine E of the aircraft 10.

The power transmission gearbox 20, 21 is generally mounted within a housing 22 (FIG. 3) configured to support the gear-train therein. The housing 22 is configured to mate to the airframe 14 of the rotary wing aircraft 10. The housing is formed from a first material and the airframe 14 includes a second material. The first and second material may be the same, or alternatively, may be different. In one embodiment, the housing 22 includes either aluminum or magnesium and the airframe 14 includes titanium. Although a particular gearbox housing 22 configuration is illustrated and described in the disclosed non-limiting embodiment, other configurations are within the scope of the invention.

Figure 3:
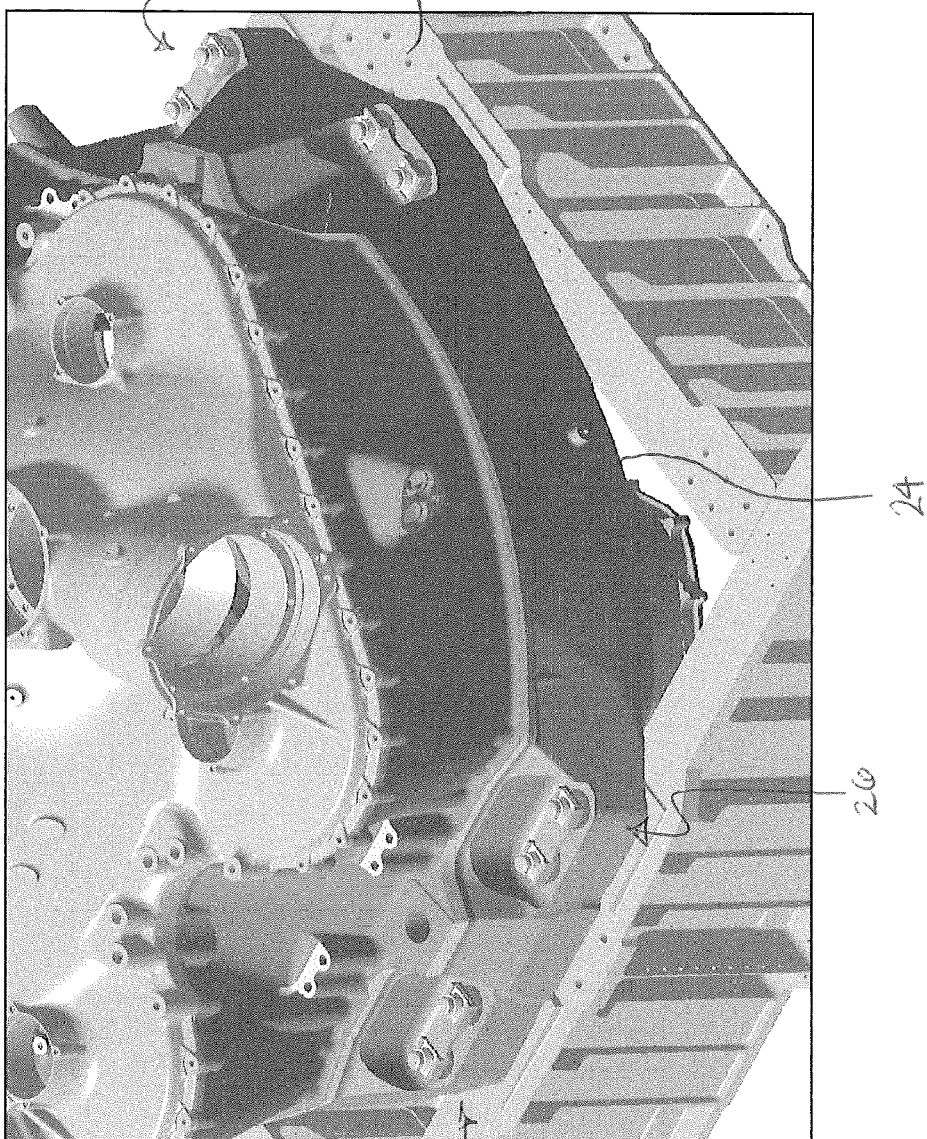
FIG. 3 is a perspective view of a bolted connection formed between a gearbox housing and an airframe of a rotary wing aircraft according to an embodiment of the present invention.
Figure 4:
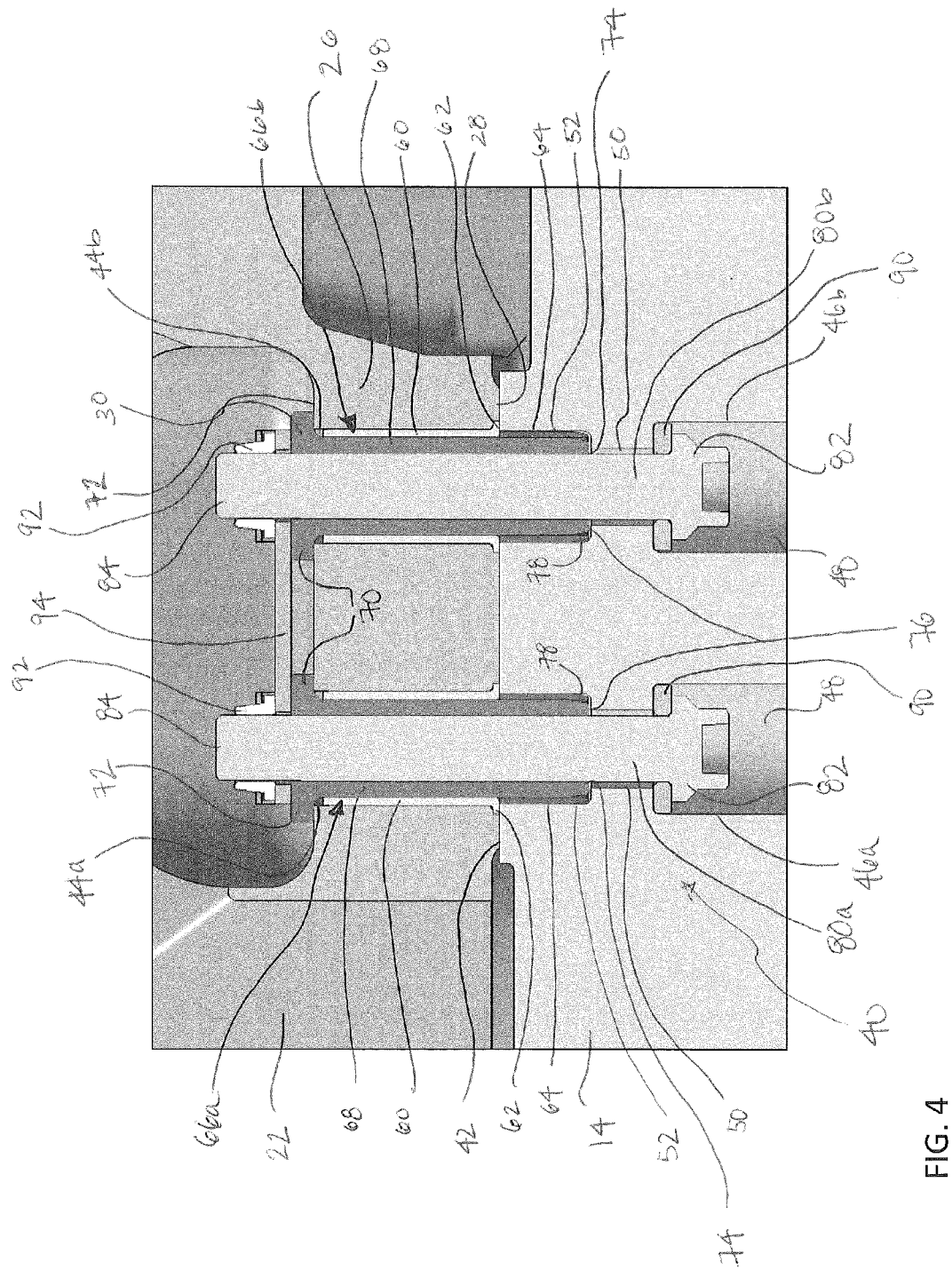
FIG. 4 is a cross-section of a bolted connection formed between a gearbox housing and an airframe of a rotary wing aircraft according to an embodiment of the present invention.

Referring to FIG. 3, the housing 22 includes a plurality of mounting feet 26 arranged about the periphery of the housing 22, near a first end 24 thereof. The mounting feet 26 are configured to couple the housing 22 to the airframe 14. Referring now to FIG. 4, a cross-section of a bolted connection 40 formed between one of the plurality of mounting feet 26 and the airframe 14 is illustrated in more detail. The connection is configured to isolate the shear loads applied to the housing 22 and airframe 14 in a first component of the connection and to isolate the axial loads applied to the housing 22 and the airframe 14 in a second component of the connection. While shown with two bolts, it is understood that the bolted connection 40 can include only a single bolt or more than two bolts in other configurations.

A first surface 28 of the mounting foot 26 contacts an adjacent surface 42 of the airframe 14 such that a substantially identical first hole 44a and second hole 44b of the mounting foot 26 are aligned with a substantially identical first hole 46a and second hole 46b in the airframe 14, respectively. The 46 holes of the airframe 14 include a first portion 48, a second portion 50, and a third portion 52, each having a substantially different diameter. The first portion 48 of each hole 46 is configured to accommodate a widened head 82 of a bolt 80 being received therein. The second portion 50 of each hole 46 has a diameter substantially smaller than the first portion 48 and slightly larger than the diameter of the bolt 80. The third portion 52 of the holes 46 has a diameter substantially equal to the diameter of a corresponding hole 44 of the mounting foot 26.

A first bushing 60 may be arranged within each hole 44 of the mounting foot 26. In embodiments where the first bushing 60 includes a flange 62, the flange 62 may be positioned adjacent the surface 28 of the housing 22 configured to contact the airframe 14. A second bushing 64 may similarly be positioned with the third portion 52 of each hole 46 of the airframe 14. While shown with bushings 60, 64, it is understood that bushings 60 and/or 64 are not required in all aspects.

A pin 66a extends through the first hole 44a of the mounting foot 26 and into the third portion 52 of the first hole 46a of the airframe 14. A substantially identical pin 66b extends through the second hole 44b of the mounting foot 26 and into the third portion 52 of the second hole 46b of the airframe 14. In one embodiment, the pins 66 are formed from a structurally capable material. Examples of structurally capable materials, include, but are not limited to, steel, aluminum, and titanium for example. Each pin 66 has a generally cylindrical body 68 with a flange 70 positioned at a first end 72 thereof, and a through hole 74 having a pin diameter extending axially through the body 68 and the flange 70. In one embodiment, the pins 66 are arranged such that the flanges 70 contact a second, upper surface 30 of the mounting foot 26. The pin 66 is configured to absorb the shear loads between the housing 22 and the airframe 14. The outer diameter of the pin 66 is generally constant over the length of the pin 66. In one embodiment, the outer diameter adjacent the second end 76 of the pin 66 gradually decreases to form a ramp section 78 configured to ease installation of the pin 66 into a hole, such as hole 44 for example. The pin diameter adjacent the first end 72 of the pin 66 may include a plurality of threads (not shown) to allow for simple installation and removal of the pin 66 using a conventional tool (not shown).

A bolt 80a extends from the first hole 46a of the airframe 14, through the through hole 72 of the pin 66a, and beyond the second surface 30 of the mounting foot 26. A substantially identical bolt 80b extends from the second hole 46b of the airframe 14, through the through hole 72 of the pin 66b, and beyond the second surface 30 of the mounting foot 26. In the shown embodiment, the bolts 80 are arranged such that the head 82 of each bolt 80 is positioned within the first portion 48 of a respective hole 46 of the airframe 14. While not required in all aspects, in the shown embodiment, a washer 90 is positioned between the head 82 of each bolt 80 and an adjacent surface of the airframe 14 to distribute the load applied thereto. A nut 92 is attached to the free end 84 of each bolt 80 to limit movement of the bolt 80, and therefore movement of the airframe 14 relative to the housing 22. A nut plate 94 is arranged around a portion of the bolt 80 between the nut 92 and the flange 70 of the pin 66. While not required in all aspects, in the shown embodiment, a single nut plate 94 extends around both bolts 80a, 80b of a mounting foot 26. The bolts 80 are configured to connect the airframe 14 to the housing 22 and to absorb the axial or thrust loads through the connection 40. The outer diameter of the bolt 80 and the inner diameter of a corresponding pin 66 form a clearance fit, or are separated by a clearance, to ensure that the axial load and the shear load (which is generally orthogonal to the axial load) are applied separately to the bolt 80 and pin 66. Although the bolted connection 40 is illustrated and described with respect to a rotary-wing aircraft 10, the connection 40 may be used at any interface between a first component formed from a first material and a second component formed from a second, distinct material, where both shear and axial loads exist. Further, it is understood that the shown nut 92 and head 82 positions can be reversed from the shown positions in other aspects of the invention.

The bolted connection 40 including a pin 66 and a bolt 80 extending through the pin 66 in a clearance fit allows for the shear and axial loads at the connection 40 to be separately applied to the pin 66 and bolt 80 respectively. By applying only axial loads to the bolt 80, the diameter of the bolt 80 and damage to the bolt 80 over the life of the rotary-wing aircraft 10 is reduced since the bolt 80 need not be used to react shear loading in addition to the axial or tensile loading. In addition, the connection 40 allows for assembly of two components (in the shown embodiment the airframe 14 and the housing 22) having a different thermal expansion coefficient over a large temperature range due to the wedging effect of the tapered end of the pin 66.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A connection between a first component and a second component comprising:
   a first hole formed in a portion of the first component;
   a second hole formed in a portion of the second component, the second hole being aligned with the first hole;
   a pin including a through hole having a pin hole diameter, the pin extending through a portion of the first hole and into a first portion of the second hole, the pin being configured to absorb a shear load applied to the connection;
   a bolt extending through the second hole and the pin, the bolt having an outer diameter smaller than the pin hole diameter such that a clearance fit is formed between the bolt and the pin, the bolt being configured to absorb an axial load applied to the connection; and a nut connected to a free end of the bolt to limit movement of the bolt relative to the first component and the second component.

2. The connection according to claim 1, wherein a diameter of the first hole and a diameter of the first portion of the second hole are substantially identical.

3. The connection according to claim 2, wherein the outer diameter adjacent a second end of the pin gradually decreases to form a ramp section.

4. The connection according to claim 2, wherein the pin hole diameter of the pin adjacent the first end includes a plurality of threads.

5. The connection according to claim 2, wherein the flange is positioned adjacent a surface of the first component.

6. The connection according to claim 1, wherein the pin further comprises:
   a cylindrical body having an outer diameter generally constant over a length of the pin; and
   a flange mounted at a first end of the generally cylindrical body, wherein the through hole extends through both the cylindrical body and the flange.

7. The connection according to claim 1, further comprising:
   a first bushing arranged within the first hole and configured to receive a body of the pin; and
   a second bushing arranged within the second hole and configured to receive an end of the pin.

8. The connection according to claim 7, wherein a washer is arranged within the second portion of the second hole between the head of the bolt and the adjacent surface of the second component.

9. The connection according to claim 1, wherein a head of the bolt is arranged within a second portion of the second hole, adjacent a surface of the second component.

10. The connection according to claim 1, wherein a nut plate is arranged between the nut and a portion of the pin.

11. The connection according to claim 1, wherein the first component is a gearbox housing of a rotary wing aircraft and the second component is an airframe of rotary wing aircraft.

12. The connection according to claim 1, wherein the first component has a first coefficient of thermal expansion and the second component has a second coefficient of thermal expansion other than the first coefficient of thermal expansion.

13. A method of forming a connection between a first component and a second component comprising:
   inserting a pin through a portion of a first hole formed in the first component and into a portion of a second hole formed in the second component, the pin being configured to absorb a shear load applied to the connection;
   inserting a bolt into the second hole and through a through hole of the pin, the bolt being configured to absorb an axial load applied to the connection, wherein a clearance fit is formed between the bolt and the pin; and
   coupling a nut to a free end of the bolt to retain the bolt in position relative to the first component and the second component.

14. The method according to claim 13, wherein the pin is inserted into the first hole such that a flange of the pin is adjacent a surface of the first component.

15. The method according to claim 13, wherein the bolt is inserted into the second hole such that a head of the bolt is adjacent a surface of the second component.

16. The method according to claim 13, further comprising installing a first bushing configured to receive a body of the pin in the first hole.

17. The method according to claim 16, further comprising installing a second bushing configured to receive the end of the pin in the second hole.

18. The method according to claim 13, further comprising installing a washer between a head of the bolt and a surface of the second component.

19. The method according to claim 13, further comprising installing a nut plate between the nut and a surface of the pin.

* * * * *